(12) United States Patent
Blanc et al.

(10) Patent No.: US 7,061,909 B2
(45) Date of Patent: Jun. 13, 2006

(54) SYSTEM AND METHOD FOR CONTROLLING THE MULTICAST TRAFFIC OF A DATA PACKET SWITCH

(75) Inventors: Alain Blanc, Tourrettes-sur-Loop (FR); Bernard Brezzo, Nice (FR); Rene Gallezot, La Colle sur Loup (FR); Franco Le Maut, Nice (FR); Thierry Roman, Nice (FR); Daniel Wind, Drap (FR)

(73) Assignee: International Business Machines Corporation, Armonk, NY (US)

( * ) Notice: Subject to any disclaimer, the term of this patent is extended or adjusted under 35 U.S.C. 154(b) by 759 days.

(21) Appl. No.: 09/950,897

(22) Filed: Sep. 10, 2001

(65) Prior Publication Data

US 2002/0075871 A1 Jun. 20, 2002

(30) Foreign Application Priority Data

Sep. 12, 2000 (EP) ................... 00480084

(51) Int. Cl.
*H04L 12/56* (2006.01)
(52) U.S. Cl. ...................... 370/390; 370/412
(58) Field of Classification Search ........... 370/390, 370/395.1, 235, 412, 413, 414, 415, 416, 370/417, 389, 392, 432, 429
See application file for complete search history.

(56) References Cited

U.S. PATENT DOCUMENTS 5,410,540 A 4/1995 Aiki et al.
5,689,505 A * 11/1997 Chiussi et al. ............. 370/388
5,898,687 A * 4/1999 Harriman et al. ........... 370/390
6,038,592 A * 3/2000 Verplanken et al. ........ 709/215

(Continued)

FOREIGN PATENT DOCUMENTS

EP 0778686 A2 6/1997

(Continued)

OTHER PUBLICATIONS

Chiussi F. M., et al; "Performance of Shared-Memory Switches Under Multicast Bursty Traffic," IEEE Journal on Selected Areas in Communications, IEEE Inc. New York, U.S., vol. 15, No. 3, Apr. 1, 1997, pp. 473-486.

(Continued)

*Primary Examiner*—Hassan Kizou
*Assistant Examiner*—Albert T. Chou
(74) *Attorney, Agent, or Firm*—Joscelyn G. Cockburn; Daniel E. McConnell

(57) ABSTRACT

A data switch is provided which routes fixed-size data packets from input ports to output ports, using shared memory which holds a copy of each packet in buffers. Output ports have a queue which contains pointers to buffers holding packets bound for that port. The number of shared memory buffers holding packets is compared to the number of buffer pointers in the output queues. In this way, a Multicast Index (MCI), a metric of the level of multicast traffic, is derived. The switch includes a Switch Core Adaptation Layer (SCAL) which has a multicast input queue. Because traffic is handled based on priority class P, a multicast threshold MCT(P), associated with the multicast input queue, is established per priority. While receiving traffic, the MCI is updated and, for each priority class in each SCAL, the MCI is compared to the MCT(P) to determine whether corresponding multicast traffic must be held.

12 Claims, 4 Drawing Sheets

U.S. PATENT DOCUMENTS

| | | | |
|---|---|---|---|
| 6,320,861 B1 * | 11/2001 | Adam et al. | 370/395.7 |
| 6,597,656 B1 * | 7/2003 | Blanc et al. | 370/219 |
| 6,603,772 B1 * | 8/2003 | Moussavi et al. | 370/432 |
| 6,760,331 B1 * | 7/2004 | Moussavi et al. | 370/390 |
| 6,895,006 B1 * | 5/2005 | Tasaki et al. | 370/390 |

FOREIGN PATENT DOCUMENTS

| | | |
|---|---|---|
| EP | 0778686 A3 | 2/1998 |
| EP | 0948169 A2 | 10/1999 |
| JP | 11-168494 | 6/1999 |
| JP | 11-275123 | 10/1999 |
| JP | 2000-049940 | 2/2000 |
| JP | 2001-509653 | 7/2001 |

OTHER PUBLICATIONS

Hasemi, Massoud R. et al; "A Multicast Single-Queue Switch with a Novel Copy Mechanism," INFOCOM '98. Seventeenth Annual Joint Conference Of the IEEE Computer and Communications Societies. Mar. 29, 1998, pp. 800-807.

* cited by examiner

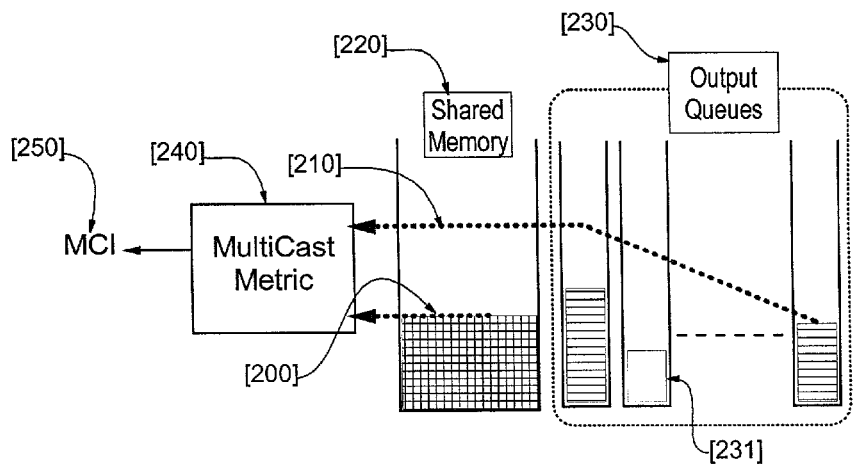
Figure 2
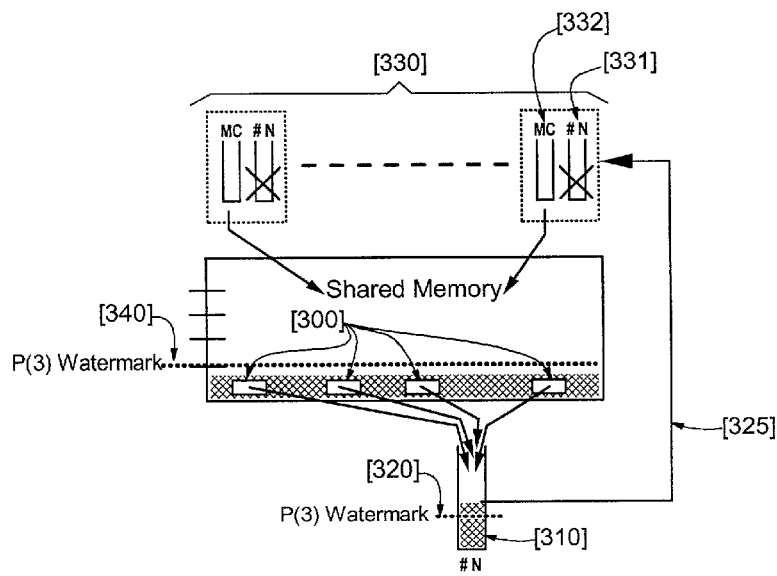
Figure 3-a

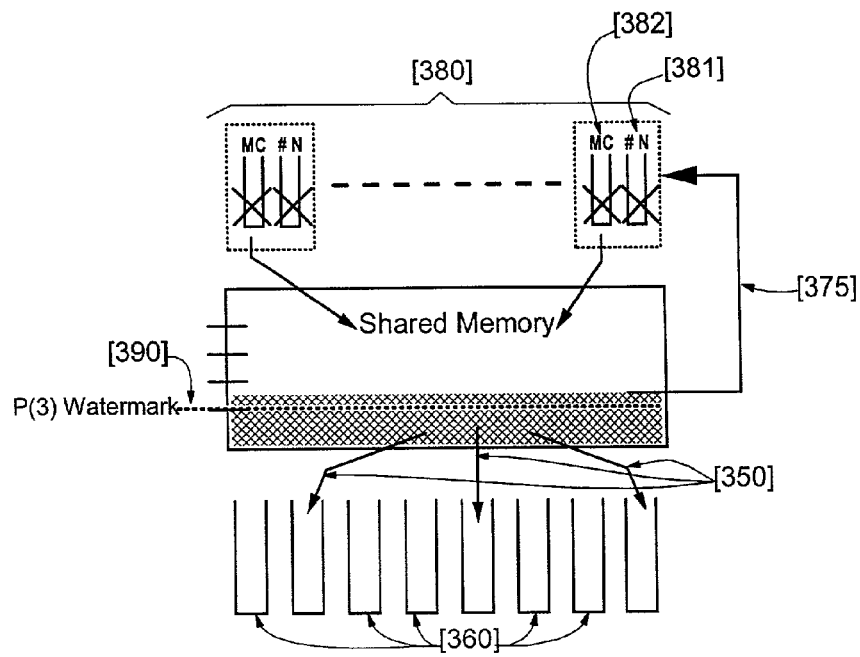
Figure 3-b
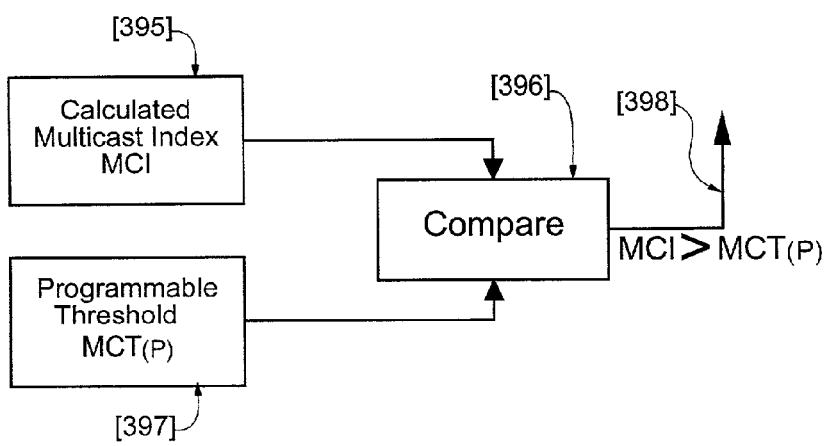
Figure 3-c

SYSTEM AND METHOD FOR CONTROLLING THE MULTICAST TRAFFIC OF A DATA PACKET SWITCH

FIELD OF THE INVENTION

The present invention broadly relates to communications networks. It is more particularly concerned with a system and method for controlling multicast and broadcast traffic of packet switches used at data network exchange nodes.

BACKGROUND OF THE INVENTION

In recent years a continued growth in demand for bandwidth over communications networks has fueled the deployment of telecommunication lines made of fiber optics. Also, to better exploit the huge bandwidth capacity of optical fibers, widespread use of WDM (Wavelength Division Multiplexing) systems has been observed. As a result, the bottleneck to carrying more and more data in large communications networks is no longer in the links but is rather at the exchange nodes. Although many different protocols for transporting data are in use, such as Asynchronous Transfer Mode (ATM), Frame Relay and Internet Protocol (IP), the implementation of network nodes capable of handling aggregate data traffic in the range of hundreds of gigabits per second (or even in terabits per second) rests mainly on switching techniques and the use of high-performance packet switch devices.

Many different approaches are available to carry out switching at network nodes. A popular solution, regardless of the higher communications protocol used to link the end-users, is to employ fixed-size packet (also referred to as cell) switching devices. These devices are more easily tunable for performance than other solutions, especially those handling variable-length packets which are often built over a ring or a bus architecture. In such a solution, N×N switches, which can be viewed as black boxes with N inputs and N outputs, are made capable of moving fixed-size packets from any incoming link to any outgoing link. An incoming link is connected to a switch fabric through an input port. In practice, there is always a port to line adapter between the physical incoming link (e.g., a fiber optic connection) and the actual switch fabric input port in order to adapt the generally complex physical protocol (e.g., SONET (Synchronous Optical NETwork standard)) to the higher communications protocols in use between switching nodes. Such adaptation is necessary to take into account the fact that switches are tailored to handle fixed-size packets and are not able to directly move the variable length packets of many protocols. Similarly, the interface between the switch fabric and the outgoing link is referred to as the output port and there is also an output adapter.

Hence, if switches have indeed evolved to accommodate the huge increase in available bandwidth resulting from the deployment of optical fibers, it remains that these devices are intrinsically intended to establish point-to-point communications, that is, their architecture is best suited for linking one incoming link to one outgoing link. Unlike a shared-medium architecture (e.g., a ring or a bus) which naturally supports multicast or broadcast traffic (since each adapter connected to the shared medium 'sees' all the traffic on the shared medium) carrying out these network mandatory functions in a switch is not straightforward. Supporting such traffic requires that, in one way or another, packets entering through an input port be replicated over some (multicast) or all (broadcast) of the output ports.

Since, in order to save internal memory, packets are not actually replicated in the switches, the management of the multicast and broadcast traffic is complex. More importantly, it tends to consume other switch resources at the expense of the unicast traffic, and thus may significantly aggravate or create traffic congestion. As an example of the added complexity, for each multicast flow, a list of output ports through which a packet has to be sent must be maintained and the single copy of the packet to be replicated cannot be released until the last port on the list has been served.

The use of switches, in particular fixed-packet switches, has proved to be a viable solution to implement terabit switching functions while shared-medium solutions, based on rings or busses, have failed to cope with the huge demand for bandwidth accompanying the deployment of optical fibers. However, this has been at the expense of having to implement, in switches, sophisticated mechanisms to effectively support broadcast and multicast using a device whose architecture does not fit well with these mandatory operations and which, most importantly, tend to quickly create traffic congestion if not properly controlled.

OBJECT OF THE INVENTION

Thus, it is a broad object of the invention to help prevent traffic congestion in a communications network as a result of the multicast and broadcast traffic to be supported in the network nodes.

It is a more particular object of the invention to provide a method and system aimed at controlling the level of multicast and broadcast traffic to be handled in a fixed-size packet switch.

It is still another object of the invention to define a simple metric to estimate the overall level of multicast and broadcast traffic handled at any given instant in a fixed-size packet switch.

It is yet another object of the invention to allow a better utilization of the internal resources of a switch.

Further objects, features and advantages of the present invention will become apparent to ones skilled in the art upon examination of the following description in reference to the accompanying drawings. It is intended that any additional advantages be incorporated herein.

SUMMARY OF THE INVENTION

A system and method for assessing the level of multicast traffic in a data switch are disclosed. The invention applies to data switches aimed at routing fixed-size data packets from input ports to output ports and comprising a shared memory for temporarily holding a single copy of each fixed-size data packet. The shared memory is comprised of buffers for storing the fixed-size data packets. The output ports are each equipped with an output port queue which contains pointers to those of the buffers holding the data packets due to leave the data switch through the output port. According to the invention, a count is maintained of the total number of shared memory buffers currently holding a data packet and due to leave the data switch. Also counted, over all output port queues, is the total number of pointers to the buffers in use. By comparing the two numbers a metric of the level of multicast traffic is derived resulting in the calculation of a MultiCast Index (MCI).

Also according to the invention, the data switch is used together with a Switch Core Adaptation Layer (SCAL) which includes a multicast input queue to hold the incoming traffic destined for more than one output port. Traffic is handled by the data switch and the SCAL on the basis of a set of traffic priority classes. Thus, a multicast threshold MCT(P) associated with the multicast input queue, per priority, is set or updated.

While receiving incoming data traffic, the MCI is calculated and updated and, for each priority class (P), in each SCAL [150], the MCI is compared to the MCT(P). If the MCI is greater, the SCAL is instructed to hold, in the multicast input queue, the incoming traffic for that priority plus all traffic of lower priorities. If the MCI is not greater than the MCT(P) then the SCAL is instructed to release incoming traffic for that priority as long as none of the higher priority traffic is currently held.

The invention therefore helps communications networks which use fixed-size data packet switches to avoid traffic congestion that would otherwise occur when a high level of multicast and broadcast traffic has to be supported at network nodes.

BRIEF DESCRIPTION OF THE DRAWINGS

FIG. 2 explains how the invention generates a MultiCast Index (MCI) assessing the level of multicast traffic.

FIG. 3 discusses the problems solved by the invention and how MCI must be compared to a MultiCast Threshold, per priority i.e.: MCT(P), to carry out the invention.

DETAILED DESCRIPTION OF THE PREFERRED EMBODIMENT

Figure 1:
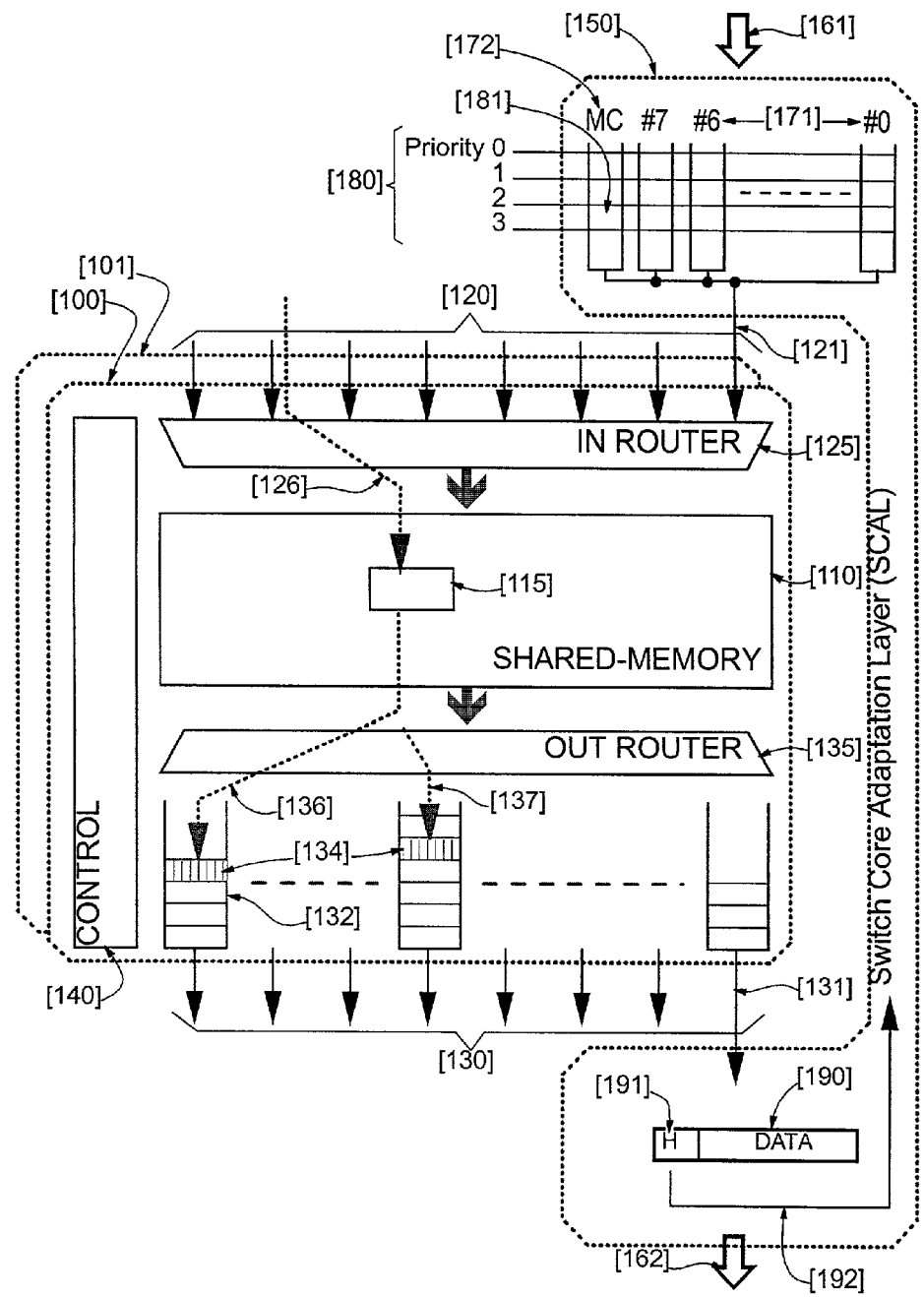
FIG. 1 shows the type of switches that may better take advantage of the invention.

FIG. 1 illustrates the concept of a switch element 100 of the kind which can better take advantage of the invention. The switching element is thus a shared-memory 110 switch with input ports 120 and output ports 130; this particular example featuring an 8-port switch element.

It is worth mentioning here that, in general, more than one such switching element may be included in a particular switch 100, 101. In practice, they may have to be combined in various expansion modes so as to increase the number of ports, the port speed, and/or the overall switch performance in order to implement a switch fabric able to meet the requirements of a particular application. Because the invention can be carried out in a single switch element or in multiple switch elements such as 100, it is assumed in the following description that, for the sake of simplicity, a single switch element is used. If several of them must actually be combined, their design is assumed to be such that they behave as a single entity equivalent to a single switch element having more ports at higher speed.

Associated with the ports, there are input routers 125 and output routers 135. At the input side, data packets are routed 126 from the input ports to buffers within the shared-memory and the output routers are used to read the packets from the shared memory buffers 136. Therefore, when a packet is received, it is allocated a free buffer 115 by the switch element control section 140. A routing vector that specifies the list of switching elements and their corresponding port identifiers in each switching element is then appended to the packets. This method of switch fabric routing control is referred to as source routing since the routing vector is determined by the initial switching element in the switch fabric using routing tables at the switch. After a packet is received, the control logic 140 analyzes the current routing vector and places the address of the packet buffer temporarily holding it 115 into an output queue such as 132. Hence, knowing the packet buffer addresses, output queues 132 can read the corresponding packets from the shared memory, in the order they have been queued by the control section, so they eventually exit switch element 100 through the appropriate output ports 130.

The multicast and broadcast operations are performed using special routing tags that do not correspond to any port identifiers. To perform a multicast, the routing tag of the packet corresponds to a list of output ports. A single copy of the packet is kept in the packet buffer 115 of the shared memory and the address of the buffer is copied to all corresponding output queues, e.g., in two output queues 134. Thus, the data packet needs only be stored once, while the pointer to where the data is stored in shared memory is replicated instead. This scheme, referred to as 'replication at sending' (RAS), provides the ultimate performance with minimum memory resources since only one copy of the packet can be read out multiple times 136, 137. In this particular example of multicast, the packet exits through two corresponding output ports.

Also, as already briefly discussed in the background section, a switch fabric has to interface communication lines through a port to a line adaptation layer, hereinafter referred to as the "SCAL" for Switch Core Adaptation Layer. There is one such SCAL 150 per pair of IN and OUT switch ports. The chief purpose of the SCAL, among other things, is to adapt the generally complex protocols used to transport data on the IN 161 and OUT 162 paths of a communication line, e.g., an optical fiber, to the IN 121 and OUT 131 ports of the switch.

Another key role of the SCAL, is to help switching elements 100, 101 to implement a lossless switching function. To help prevent traffic congestion and to avoid the discarding of any packets the input leg of the SCAL 150 is equipped with buffering in addition to the buffering provided in the switch, i.e., the shared memory 110. Regardless of the way it is actually implemented, this extra buffering is organized as a series of queues: one per output port 171 plus one for the multicast traffic 172. The purpose of these queues is to temporarily hold, when necessary, the incoming traffic before it enters the switch. So, there is a common queue 172 for all the traffic that must exit the switch through more than one output port, i.e., the multicast traffic. For the traffic destined for a single output port, the unicast traffic, there is one dedicated queue per port 171.

In addition, a switching function of the kind shown in FIG. 1 has to manage classes of traffic on the basis of priorities, in order to offer differentiated types of service to the end users. As an example (more or fewer levels could be considered as well) four priority levels (0–3) are assumed in the description of the invention. Level 0 has, in this description, the highest priority and corresponding traffic must be expedited in case of congestion versus traffic of lower priorities; namely, level 1, level 2 and level 3. Also, if some packets must be discarded, as a last resort to prevent congestion, this will start with priority 3 traffic. Therefore, associated with the various queues used either within the switch element 132 or in the SCALs 171, 172, there are watermarks 180 indicating a congestion threshold, one per priority level. When a queue is filling up and a watermark is crossed 181 this serves as a trigger for all the appropriate actions which are further discussed in the rest of this description.

Watermarks are also associated with the filling of the switch shared memory 110. If the watermark associated with a certain priority level is crossed in the switch shared memory, all the SCALs must hold all the switch input traffic at the corresponding priority level (plus all traffic at any lower priority levels). On the contrary, if a certain priority water-mark of output queue 132 is crossed the actions are more selective. Although all SCALs are still involved, only the traffic for that port 132 has to be held in the corresponding SCAL input queues.

Finally, the mechanism by which all elements are made aware of the status of the various queues and the occupancy level of the shared memory is largely dependent on the particular design of the switch elements composing the particular switch fabric. Although this is beyond the scope of the invention and many other alternate methods could be used while practicing the invention, a preferred way of operating consists of carrying this type of information in the header part (overhead) 191 of the packets 190 leaving or entering the switch respectively through an output port 131 or an input port 121. What is occurring within the switch element 100 can be reported by the traffic exiting a port 131 and passed back 192 to the input leg of the SCAL. The SCAL is thus kept updated on the internal status of the switch and is always aware of the congestion status of all the output port queues 132. Hence, each SCAL can take appropriate actions like temporarily holding the traffic destined for a busy output port. Similarly, controlling information can be carried over the data packets entering the switch through an input port 121 so that this information is possibly broadcast to all other SCALs over traffic exiting all switch output ports 130.

This scheme, referred to as in-band controlling, which not only utilizes the switch bandwidth to transport the end-user data but also the switch controlling information, allows the controlling information to be easily spread to all elements that need to receive it. This scheme scales up very well when switch elements must be added 100, 101 to expand the switch performances and characteristics. Importantly, this scheme neither requires that specific signal I/O's be devoted to the exchange of control information between the various components nor does it assume that there is a central control element in charge of monitoring the individual switch elements.

FIG. 2 depicts the metric used to assess the extent of the multicast traffic occurring at any given instant within the switch. Because of the structure of the switch, described in FIG. 1, a simple metric can be used which consists of comparing the actual filling 200 of the shared memory 220 to the sum of what has been enqueued 210 in the port output queues 230 in the form of buffer pointers 231 (and which have not yet been forwarded). The number of buffers that are currently allocated in the shared memory for temporarily holding the switched traffic is thus compared to the total number of buffer pointers that are still in the port output queues. Obviously, if the two numbers are the same that means that no multicast traffic is required at this time since there is a one to one correspondence between each temporarily held packet and its single destination port. However, as soon as some packets must exit the switch through multiple output ports, because it has been determined that multicast is required by some of the entering traffic, this results in the replication of buffer pointers in more than one output queue. Therefore, the sum of the buffer pointers will become higher than the number of allocated buffers in the shared memory thereby. The size of the difference provides a way of measuring the extent of the multicast traffic. A Multi Cast Index (MCI) 250 based on such a metric must be generated 240 so that appropriate actions can be taken on a traffic priority basis. Several ways of generating this metric can be considered. As an example, the ratio of the total number of buffer pointers present in the output queues over the number of allocated buffers in the shared memory can be calculated so that the result is a MCI index number equal to or larger than 1..The higher the index number the more intense the level of multicast traffic with an upper possible value which is implementation dependent (it depends on the respective sizes of the shared memory versus the sum of output queue sizes). This way of practicing the invention requires that a division be performed which would necessitate a sophisticated piece of hardware to carry it out at very high speed. A more simple approach consists of calculating the difference between the two numbers instead. This requires a simple adder. Hence, an index value of zero is returned when no multicast is being performed and, like in the previous case, the higher the index value the more intense the level of multicast traffic with an upper bound which is also implementation dependent. Therefore, in a preferred embodiment of the invention the simple metric used to assess the multicast intensity is:

$$MCI = \Sigma^N OQPP - SMAPB \text{ with:}$$

MCI=MultiCast Index

OQPP=Output Queue Packet Pointers (over N ports)

SMAPB =Shared Memory Allocated Packet Buffers

However, it must be understood that the choice of this simple multicast index, in a preferred embodiment of the invention, does not preclude whatsoever the use of alternate, more sophisticated methods for generating an index representative of the extent of the multicast traffic.

As briefly discussed here above, the ratio of the relative filling of the shared memory versus the sum of what is queued in the output port queues or any alternate solution to measure the multicast traffic intensity could be preferred in a particular implementation without departing from the spirit of the invention.

FIG. 3 briefly discusses two situations typical of the state of the art in which an unconstrained level of multicast traffic creates problems. This helps to better understand the advantages of the invention further discussed in FIG. 3-c.

FIG. 3-a is an example of a problem that arises when the shared memory is holding, at some point in time, many multicast packets 300, e.g., of priority 3, destined for a same output port 310. Then, because the corresponding output queue is filling up, the priority 3 watermark 320 is quickly crossed. Hence, through the mechanism previously discussed, whereby the switch control information is spread to all switch components 325, all the SCAL input legs 330 soon become aware of the fact that a given output port queue 310 is building up. As a consequence, the received traffic in the corresponding unicast input queues 331, for priority 3 in this example, is held in every SCAL unicast queue for that port. However, because the SCAL input multicast queues 332 are not dedicated to a particular port they are NOT instructed to hold their traffic for that priority as long as the shared memory watermark 340 of priority 3 is not crossed. This leads to a great deal of unfairness between multicast and unicast traffic since only the latter is held while the reason for a particular output queue building up may be mostly, if not solely, the result of the former. Therefore, in these cases, stopping the unicast traffic may not even significantly help to solve the problem.

FIG. 3-b depicts another example of the difficulties encountered if the level of multicast traffic is uncontrolled.

When multicast packets are accepted in the shared memory and if they happen to be mostly destined for one or more output ports 350, so that multicast traffic is temporarily biased to some certain output ports (while, ideally, it should be equally spread over all output ports) then, shared memory usage tends to build up rapidly and the watermark of a corresponding priority crossed 390, e.g., priority 3. Hence, as soon as the priority 3 watermark of shared memory is crossed 375 all the traffic for that priority is held in all unicast and multicast queues 381, 382 of every SCAL 380. This occurs even though the other output port queues 360 are not busy and could handle traffic for that priority perfectly well. This also creates unfairness since all the traffic of certain priorities (i.e., of level 3 in this example or of levels 2 and 3 if the priority 2 watermark was crossed, etc.) is unconditionally held 382 regardless of the output port destinations. This is true even though some of them may be idle or lightly loaded 360 for that priority(ies), resulting in an under-utilization of the switch resources.

FIG. 3-c explains how the invention is carried out. The multicast index MCI 395, calculated as explained in FIG. 2, is compared 396 to a programmable multicast threshold 397 per priority: $MCT_{(P)}$. The user of the switch thus has the freedom of customizing the behavior of the switch for a particular application. The invention enables the control of the multicast queues of the SCALs 330, 380 on top of all the other mechanisms normally used to control the flow of data between the IN and OUT ports. More specifically, if the level of multicast is below or equal to the threshold set by the user nothing specific is undertaken as far as multicast traffic is concerned. However, if the set threshold is crossed, i.e., the MCI becomes larger than the $MCT_{(P)}$.398 then this is reported to all the SCAL input legs 330, 380 in order to hold traffic on the multicast queues 332, 382. This is done regardless of the actual filling of the shared memory so as to prevent the problem discussed with regard to FIG. 3-a.from ever occurring (multicast traffic was still permitted to flow in even though it was the main contributor to the congestion observed in one, or more, output port queue(s) 310). In other words, the SCAL multicast queues have their own independent control mechanism based on the overall actual level of multicast traffic observed at a given instant in the switch so that, when in the situation of FIG. 3-a, multicast traffic is stopped. This mechanism also allows the switch to avoid the problem discussed with regard to FIG. 3-b.since the decision to hold the multicast queues is no longer based on the filling of the shared memory. Thus, the SCAL multicast queues may still be authorized to send traffic at a certain priority level, so that the not-so-busy ports 360 get a chance to handle it, as long as the multicast index remains below the corresponding threshold.

Figure 4:
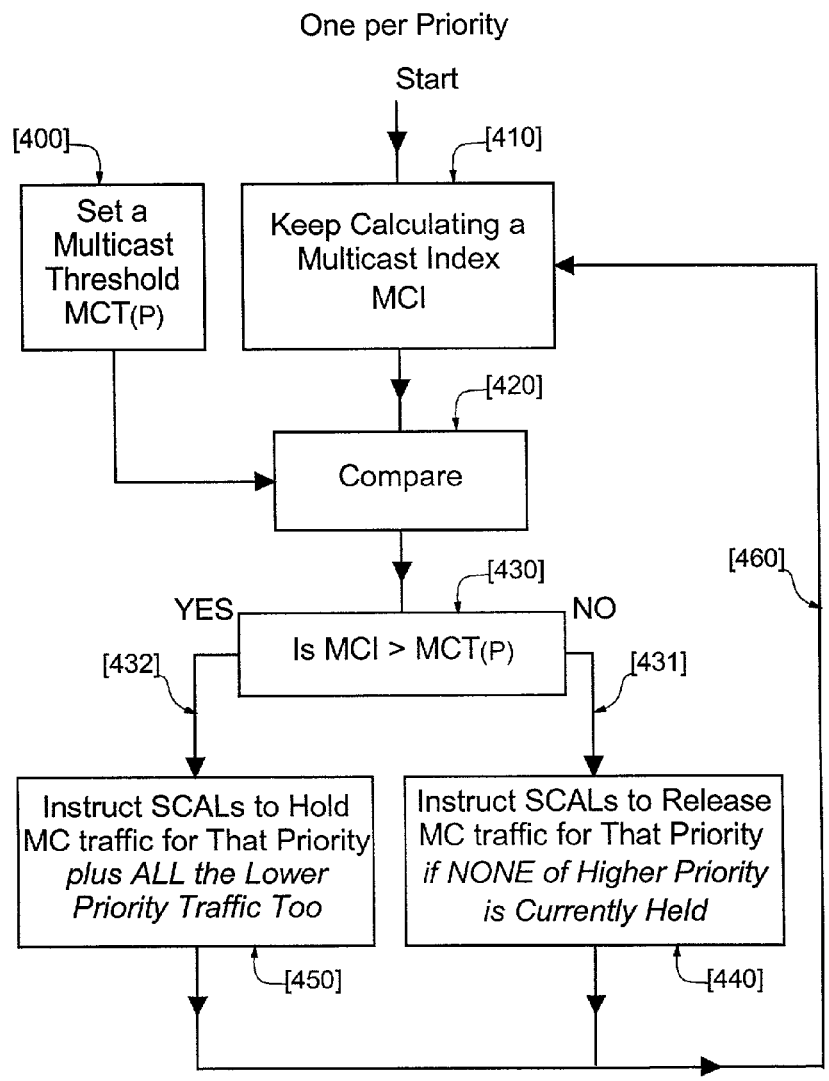
FIG. 4 shows the steps of the method per the invention.

FIG. 4 depicts the steps of the method according to the invention. The multicast index , the MCI 400, is calculated and kept updated within the switch. Prior to this, once for all, or regularly updated, depending on the application, a multicast threshold $MCT_{(P)}$ 410 is set per priority P. This latter is compared 420 to the MCI. If the MCI is below or equal to the $MCT_{(P)}$ 431 the SCALs are instructed to release 440 a possible previously held state corresponding to that priority, as long as no traffic of higher priority is currently held. If the answer to step 430 is positive, i.e., the MCI is larger 432, the SCALs are instructed 450 to hold traffic of the current priority (or to confirm a previous hold) plus all traffic of lower priorities, if any. After which the method keeps cycling 460 thus, resuming at step 400 while the switch is up and running. This is performed sequentially or in parallel to cover all priority classes of traffic. The Multicast Thresholds 400 are set so that the higher the priority the larger the threshold in order that lower priority classes of traffic are held first.

Although explained in the context of a switch element 100, 101 of the kind shown in FIG. 1 it must be understood by those skilled in the art that the invention could be practiced in a different environment as well. Especially, the invention also applies in the output leg of a SCAL function 150 having memory to further hold the outgoing traffic in the case where more than one communication line 162 is handled from a single SCAL hence, implementing sub-ports. In this case, because multicast must be carried out down to each subport, the same kind of problems as described at length in the previous figures may now occur in the SCAL output leg alone necessitating the implementation of the invention to avoid them.

What is claimed is:

1. A method for assessing a level of multicast traffic in a data switch for routing fixed-size data packets from input ports to output ports, said switch comprising a shared memory for temporarily storing a single copy of each said fixed-size data packet, said shared memory comprising buffers for storing said fixed-size data packets, said output ports each equipped with an output port queue, each said output port queue containing pointers to those of said shared memory buffers holding said data packets bound for said output port; said data switch being used together with a Switch Core Adaptation Layer (SCAL), said SCAL including a multicast input queue for holding incoming data traffic to be routed through said data switch and destined for more then one of said output ports, said data switch and said SCAL handing said incoming data traffic on the basis of a set of priority classes (P), said method comprising the steps of:

setting a multicast threshold MCT(P) associated with said multicast input queue prior to receiving said incoming data traffic;

counting a buffer count, said buffer count being a total number of said shared memory buffers currently holding a said data packet;

counting, over all said output port queues, a pointer count, said pointer count being a total number of said pointers to said shared memory buffers;

deriving from said buffer count and said pointer count a MultiCast index (MIC), a metric of said level of multicast traffic; and optionally updating said multicast threshold MCT(P) while receiving said incoming data traffic.

2. The method according to claim 1 including the further steps of:

maintaining a current said MCI; and for each said priority class (P), in each said SCAL;

comparing said MCI to said MCT(P);

if said MCI is larger than said MCT(P), holding said incoming traffic in said multicast input queue for that priority plus all lower priority traffic;

if said MCI is not larger than said MCT(P), releasing said incoming traffic for that priority as long as no higher priority traffic is currently held;

repeating the above steps while receiving incoming traffic.

3. The method according to claim 2 wherein said MCI is calculated as the difference between said total number of said shared memory buffers currently holding a said data packet and said total number of said pointers to said buffers present in all said output port queues.

4. The method according to claim 2 wherein said MCI is calculated as the ratio of said total number of said shared memory buffers currently holding a said data packet over said total number of said pointers to said buffers present in all said output port queues.

5. A system for assessing a level of multicast traffic in a data switch for routing fixed-size data packets from input ports to output ports, said switch comprising a shared memory for temporarily storing a single copy of each said fixed-size data packet, said shared memory comprising buffers for storing said fixed-sized data packets, said output ports each equipped with an output port queue, each said output port queue containing pointers to those of said shared memory buffers holding said data packets bound for said output port; said data switch is being used together with a switch core adaptation layer (SCAL), said SCAL including a multicast input queue for holding incoming data traffic to be routed through said data switch and destined for more then one of said output ports, said data switch and said SCAL handing said incoming data traffic on the basis of a set of priority classes, said system comprising:
- a first counting circuit that counts a buffer count, said buffer count being a total number of said shared memory buffers currently holding a said data packet;
- a second counting circuit that counts a pointer count, said pointer count being a total number of said pointers to said shared memory buffers;
- a first comparator that uses said buffer count and said pointer count to derive a MultiCast Index (MCI), said MCI being a metric of said level of multicast traffic; and
- a multicast threshold circuit associated with each multicast input queue that receives, stores and optionally updates a multicast threshold MCT(P) for each said traffic priority.

6. The system according to claim 5, the system further comprising:
- a second comparator associated with each said SCAL that compares said MCI to said MCT(P) for each priority;
- a hold circuit associated with each said SCAL that holds said incoming traffic in said multicast input queue for priority P and all lower priorities, said hold circuit being coupled to said second comparator such that said hold circuit becomes active when said MCI is greater than said MCT(P); and
- a release circuit associated with each said SCAL that releases said incoming priority P traffic from said multicast input queue, said release circuit being coupled to said second comparator and said hold circuit such that said release circuit becomes active when said MCI is less than said MCT(P) and said hold circuit is not active for traffic of any priority higher than P.

7. The system according to claim 6 wherein said first comparator is an adder and said MCI is the difference between said buffer count and said pointer count.

8. The system according to claim 6 wherein said first comparator is a divider and said MCI is the ratio of said buffer count over said pointer count.

9. A computer storage medium for use with a data switch for routing fixed-size data packets from input ports, said switch comprising a shared memory for temporarily storing a single copy of each said fixed-size data packets, said output port each equipped with an output port queue, each said output port queue containing pointers to those of said shared memory buffersholding said data packets bound for said output port; said data switch being used together with a switch core adaptation layer (SCAL), said SCAL including a multicast input queue for holding incoming data traffic to be routed through said data switch and destined for more then one of said output ports, said data switch and said SCAL handing said incoming data traffic on the basis of a set if P priority classes, said storage medium holding a set of computer instructions comprising;
- a first counting code module that counts a buffer count, said buffer count being a total number of said shared memory buffers currently holding a said data packet;
- a second counting code module that counts a pointer count said pointer count being a total number of said pointers to said shared memory buffers;
- a first comparing code module that uses said buffer count and said pointer count to derive a MultiCast Index (MCI) being a metric of said level of multicast traffic; and
- a first storing code module associated with each multicast input queue for receiving, storing and optionally updating a multicast threshold MCT(P)P for each said traffic priority.

10. The computer storage medium according to claim 9, said set of computer instructions further comprising:
- a second comparing code module associated with each said SCAL that compares said MCI to said MCT(P) for each priority;
- a holding code module associated with each said SCAL that holds said incoming traffic in said multicast input queue for priority P and all lower priorities, said holding code module receiving control from said second comparing code module when said MCI is greater than said MCT(P);
- a releasing code module associated with each said SCAL that releases said incoming priority P traffic from said multicast input queue, said releasing code module receiving control from said second comparing code module when said MCI is less than said MCT(P) and said holding code module does not have control for traffic of any priority higher than P.

11. The system according to claim 10 wherein said first comparing code module derives said MCI as the difference between said buffer count and said pointer count.

12. The system according to claim 10 wherein said first comparing code module derives said MCI as the ratio of said buffer count over said pointer count.

* * * * *